Oct. 28, 1930.  R. E. JORDAN  1,779,546
MEAT COOKER AND SHAPER
Filed May 3, 1922    2 Sheets-Sheet 1
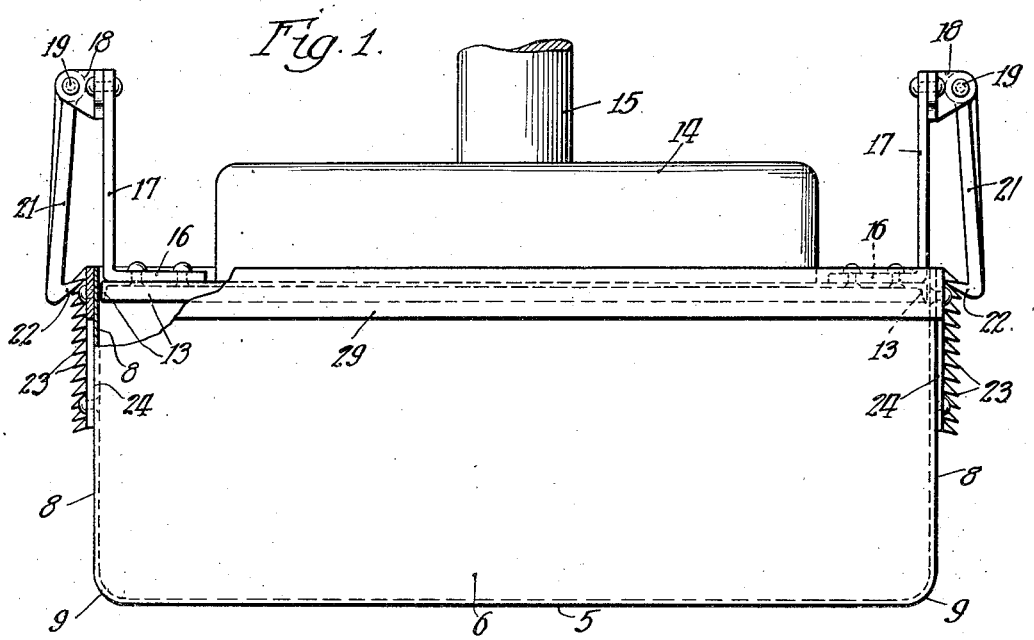
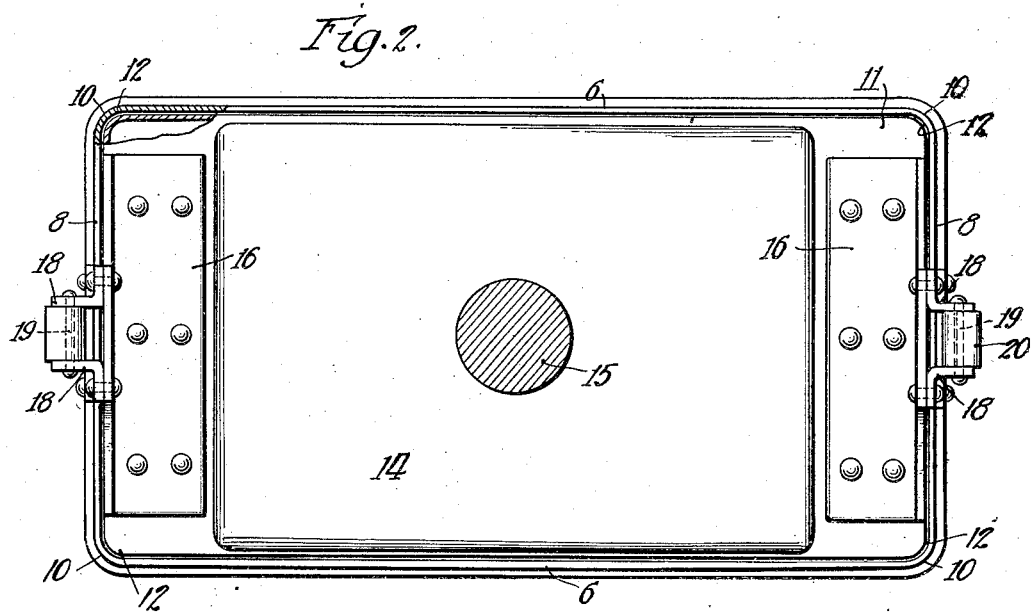
Inventor.
Robert E. Jordan.
Jabel + Mueller Attys.

Oct. 28, 1930.  R. E. JORDAN  1,779,546
MEAT COOKER AND SHAPER
Filed May 3, 1922  2 Sheets-Sheet 2

Inventor:
Robert E. Jordan.
Jabel & Mueller
Attys

Patented Oct. 28, 1930

1,779,546

UNITED STATES PATENT OFFICE

ROBERT E. JORDAN, OF CHICAGO, ILLINOIS, ASSIGNOR, BY MESNE ASSIGNMENTS, TO THE ALLBRIGHT-NELL CO., A CORPORATION OF ILLINOIS

MEAT COOKER AND SHAPER

Application filed May 3, 1922. Serial No. 558,258.

My invention relates to meat cookers and shapers, and more particularly to a device for cooking and forming a tapering piece of uncooked boneless meat into a cooked piece of substantially uniform size, texture and quality throughout. This application is a continuation in part of my application, Serial No. 458,436, filed April 4, 1921.

Hams and shoulders (which are commonly called picnic hams) are larger at one end, known as the butt end, than at the other end, known as the shank end, and these hams or shoulders taper substantially uniformly from the widest portion thereof to a point at the smallest portion thereof. The butt end is made up of meat of fine texture and good quality, while the shank end is made up of meat of course texture and relatively poor quality, and contains a considerable proportion of gristle.

It is a purpose of the invention to provide a method for making a cooked ham from said tapering piece of meat, which is substantially uniform in cross section throughout and which is of substantially uniform quality and texture throughout. Preferably the cross section is rectangular whereby a great saving of meat is obtained in the making of sandwiches.

In order to accomplish the purposes outlined above, a new and improved form of ham retainer is provided which serves both as a container for the ham while the same is being cooked and a mold for shaping the ham prior to and during the cooking operation. Ham boilers or molds of various kinds have been previously used and these are of two general types, that is, they are completely closed on all sides or are open on the ends. My improved meat cooker and shaper is of the closed type, as a mold that does not completely enclose the ham is very objectionable in that the water in which the ham is boiled can enter the meat, thus not only making the flavor of the meat inferior but also being unsanitary. It is also impossible, in a mold that is open at the ends, to obtain the desired compression of the meat so as to cause the flowing of the parts thereof that are of superior quality longitudinally of the piece into juxtaposition to the meat of inferior quality so as to produce a piece of substantially uniform quality throughout. While molds closed at the ends and sides have been previously used, the pressure to which the meat is subjected in said molds cannot be made sufficiently great to obtain the desired flowing of the meat due to the fact that springs are dependent upon for obtaining this pressure. Furthermore, these molds are not fluid tight, nor substantially fluid tight, and accordingly do not retain the juices of the meat and consequently do not retain the flavor which the meat has due to the curing thereof.

It is a purpose of the invention to provide a meat cooker and shaper which is provided with fixed rigid side and end walls, a rigid bottom and a rigid cover, and means whereby the cover is adapted to close the container so as to make the same fluid tight whereby the above mentioned objections are overcome. Preferably this container or mold is of substantially uniform cross section throughout and rectangular, that is, preferably the bottom, the sides, the end walls and the top are made plane faced and are substantially at right angles to each other. By providing a closed rigid container that is fluid tight in applying the necessary pressure, the jellies in the meat are retained and serve to bind the piece of meat together in its compressed form with the better parts adjacent the inferior parts thereof so as to form a piece of cooked meat of substantially uniform quality and texture throughout, which is firmly knit together from end to end thereof.

The pressure necessary to obtain the desired flowing of the meat is comparatively great and is preferably applied by means of a suitable steam or compressed air press exerting a pressure of not less than 60 lbs. per square inch, the best results being obtained with a pressure of substantially 80 lbs. per square inch.

Other objects and advantages of the invention will appear as the description of the accompanying drawings proceeds. However, I desire to have it distinctly understood that I do not intend to limit myself to the exact details shown or described but that I intend to include as part of my invention all such obvious changes and modifications of parts as would occur to a person skilled in this art and as would fall within the scope of the claims.

In the drawings:

Fig. 1 is a side elevation of my improved ham cooker and shaper partly broken away showing the head of a press applied thereto;

Fig. 2 is a plan view of the device shown in Fig. 1, a portion thereof being broken away;

Figure 3:
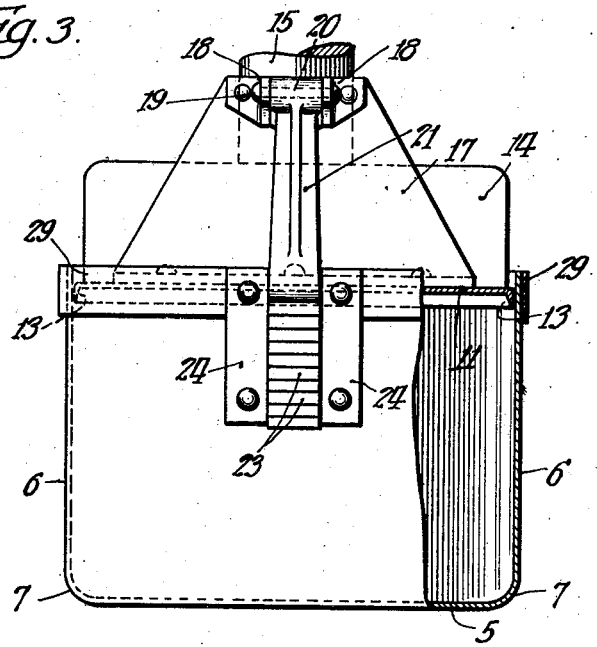
Fig. 3 is an end view thereof partly broken away.
Figure 4:
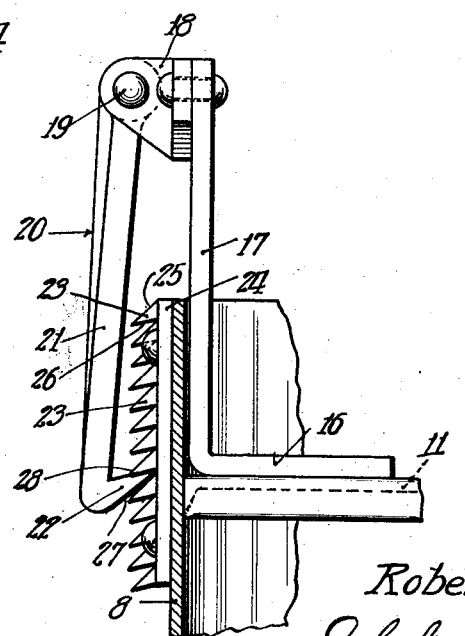
Fig. 4 is an enlarged detail view showing the improved rack and pawl construction whereby the cover is adapted to be automatically held in meat compressing position.

Referring in detail to the drawings, the improved meat cooker and shaper comprises a container having a plane flat bottom 5, straight substantially plane faced side walls 6, extending substantially at right angles to the bottom 5, the corners between the bottom and sides being preferably slightly rounded as shown at 7, and straight end walls 8 which are plane faced, and which extend substantially at right angles to the bottom 5 and the sides 6. The corners at the junction of the bottom and end walls are preferably slightly rounded as indicated at 9 and the corners at the junction of the sides 6 and the ends 8 are preferably slightly rounded as indicated at 10. This rounding is preferably only sufficient to make it easy to remove the meat from the corners of the mold as a sharp corner would tend to make the meat stick in the corners of the mold so as to make removal thereof difficult. The bottom 5, the sides 6 and the ends 8 are all fixed and are made of sufficient thickness and of such material as to be substantially rigid. A rigid cover member 11 is also provided, said cover member being made of such shape as to conform to the inner surface of the mold, the corners thereof being rounded as indicated at 12 to conform to the rounding of the corners 10 so as to provide a snug fit at the corners as well as at the sides and ends, said cover 11 being rigid, forms together with the body portion, a substantially rigid closed container adapted to receive the meat that is to be cooked. The edges of the cover 11 are down turned as indicated at 13 and are preferably thinned so as to form flexible depending flanges which are adapted to spread laterally so as to engage with the side and end walls of the body portion to provide a fluid tight fit between the cover and the body portion when the head 14 mounted on the rod 15 forces the same downwardly toward the bottom with a piece of uncooked boneless meat between the cover and the bottom. In order to hold the cover member in such a position as to compress the meat within the device, a pair of angular plates is provided, each of which has a portion 16 extending parallel to the cover and riveted thereto, and a portion 17 extending at right angles thereto and substantially parallel to the ends 8 of the mold. The legs 17 of the angular members are provided with ears 18 which are riveted thereto or secured thereto in any other desired manner, having perforations through which the pivot pins 19 extend upon which the pawls 20 are pivotally mounted. Said pawls 20 are provided with elongated shank portions 21 and with teeth 22 which are tapered as clearly shown in Fig. 1 and in Fig. 4, and which are provided with an engaging face which extends at an acute angle to the shank 21. Each of the teeth 22 is adapted to engage with teeth 23 provided on the members 24 which are secured in any suitable manner, such as by riveting to the ends 8 of the container. The teeth 23 are provided with inclined faces 25 and faces 26 which are only slightly inclined to the perpendicular so as to form ratchet teeth, the outer edges of which are substantially in alignment with the pivot pins 19. Thus the teeth 22 on the pawls 20 will engage with the teeth 23 on the racks provided on the container, automatically, due to the action of gravity, as the elongated hooks with the teeth thereon will tend to be thrown into engagement with the ratchet teeth due to the action of gravity, the long inclined faces 27 of the teeth 22 sliding over the inclined faces 25 of the teeth 23 upon downward movement of the cover relative to the body portion, but the holding faces 28 of the hooks 22 engaging with the only slightly inclined faces 26 of the teeth 23 to hold said cover from movement away from said bottom when the pressure applied by means of the head 14 is removed therefrom. In order to strengthen the container at the upper free edge portion thereof and reinforce the same, a reinforcing band 29 is provided which extends around said upper edge portion on both sides and ends thereof from one of the plates 24 to the other plate 24 on the opposite end.

In use the ham, which is as is well known provided with a wide end, known as the butt end, and a narrow end, known as the shank end, is pressed in the body portion of the container, and the container is of such size that the wider portion of the ham will be of greater width than the width of the mold and the narrower portion is of less width than the width of the mold. The skin of the ham may be removed or may be secured with a few stitches or merely by tying a string around the same depending upon the custom followed by the packer who is using the mold. These strings, however, are not used for holding the meat together, but merely for holding the skin in place, as the skin does not very readily adhere to the other parts of the ham due to the fact that it is comparatively rather stiff. After the ham has been placed in the mold, the cover is placed in position and the head of the press is brought down into engagement with the cover so as to exert a pressure of not less than 60 lbs. per square inch thereon, and preferably about 80 lbs. per square inch which gives the best results. The press practically applies the pressure with a hammer blow making the operation very rapid. As the lid of the cover travels downwardly toward the bottom, the teeth on the pawls ride over the ratchet teeth until the pressure is relieved, when, due to the compression of the meat, there is an upward pull on the lid causing the pawls to engage with the ratchet teeth firmly so as to prevent movement of the cover away from the bottom of the mold. Due to the fact that the lid fits tightly on the body portion of the mold, because the downwardly extending flanges thereon are forced outward against the sides of the mold by the pressure within the same, the mold is sealed substantially liquid tight as long as the pressure exists therein which is produced due to the compression of the meat. The mold is then placed in a vat or tank of boiling water for a sufficient length of time to cook the same.

It will be noted that due to the fact that there are no springs, cross bars, or other projecting parts on the mold, the same can be very readily stacked in close formation in the vat, this being especially due to the fact that they are rectangular in outline and have very few projecting parts, and these parts being so narrow that said molds can be easily stacked crosswise on top of the first layer and then the layers alternated throughout the depth of the vat. As the mold is sealed liquid tight it will be evident that the contents of the mold cannot escape and the water within which the ham is boiled cannot enter into the mold. All of the juices of the meat are consequently retained and a superior flavor results. Due to the pressure used and due to the relative shape of the mold and the piece of meat, a portion of the meat at the butt end thereof which is of superior quality, will be forced lengthwise of the piece toward the portion thereof which is of inferior quality, thus producing a piece of meat in which the slices thereof are of substantially the same quality throughout. The meat at the wide end being of better texture than at the narrow end, the pressure also will cause the texture of the meat to be made substantially uniform because of the flowing of the meat explained above. As the mold is sealed liquid tight, the jellies in the meat do not escape as would be the case where a container that is not completely closed were used, and this jelly in forming in the mold knits the meat firmly together so as to form a substantially solid piece without cracks therein from end to end of the piece of meat.

Having thus described my invention, what I desire to claim and secure by U. S. Letters Patent is:

1. The method of converting a tapering piece of uncooked boneless meat into a cooked piece of substantially the same cross section throughout, comprising the placing of said uncooked piece of meat into a closed rigid container of substantially uniform cross section from end to end thereof, said container being of smaller dimensions than the greatest dimensions of said piece and of greater dimensions than the smaller portions of said piece to force the excess of said meat to flow longitudinally of said piece into the corners of said container, sealing said container substantially liquid tight, rigidly holding said meat compressed in contact with substantially the entire inner surface of said container, and cooking said meat while compressed in said sealed container.

2. A device for cooking and shaping boneless meat, comprising a container having a rigid bottom, rigid, fixed side and end walls, a rigid cover member, and means for substantially rigidly holding said cover member in adjusted position, said cover member having depending flexible flanges at all the edges thereof, for sealing said container when said cover is forced toward said bottom.

3. The method of forming a substantially solid knit together piece of cooked meat of substantially uniform cross section and quality throughout the length thereof from a tapering piece of uncooked meat having superior and inferior portions and a bone cavity, comprising pressing of said uncooked piece into a container of substantially uniform size under sufficient pressure to cause some of the meat of the larger portion of superior quality to flow lengthwise of said piece into a juxta-position to the inferior portions thereof, sealing said container substantially liquid tight, holding said meat under said pressure, and cooking said meat while held sealed under said pressure, whereby the juices and jellies in said meat are retained and serve to knit said meat together to form a substantially solid piece from end to end thereof.

In witness whereof, I hereunto subscribe my name this 1st day of May, A. D., 1922.

ROBERT E. JORDAN.